United States Patent [19]

Heller

[11] Patent Number: 5,345,334
[45] Date of Patent: Sep. 6, 1994

[54] MECHANICAL CONTROL UNIT FOR A SURGICAL MICROSCOPE CONNECTED TO A STAND

[75] Inventor: Rudolf Heller, Zürich, Switzerland

[73] Assignee: Carl-Zeiss-Stiftung, Heidenheim

[21] Appl. No.: 956,413

[22] Filed: Oct. 5, 1992

[30] Foreign Application Priority Data

Oct. 8, 1991 [DE] Fed. Rep. of Germany ....... 4133241

[51] Int. Cl.$^5$ .............................................. G02B 7/24
[52] U.S. Cl. ..................................... 359/393; 359/394
[58] Field of Search ................ 359/391, 392, 393, 394

[56] References Cited

U.S. PATENT DOCUMENTS

| 4,339,100 | 2/1982 | Heller et al. | |
| 4,344,595 | 8/1982 | Heller et al. | |
| 4,702,565 | 10/1987 | Schilling et al. | 359/394 |
| 5,173,802 | 12/1992 | Heller | 359/393 |
| 5,173,803 | 12/1992 | Heller | 359/393 |

FOREIGN PATENT DOCUMENTS

| 1092685 | 11/1960 | Fed. Rep. of Germany | 359/393 |
| 2746437 | 4/1979 | Fed. Rep. of Germany | 359/394 |
| 482439 | 1/1970 | Switzerland . | |

Primary Examiner—Edward K. Look
Assistant Examiner—Mark Sgantzos
Attorney, Agent, or Firm—Walter Ottesen

[57] ABSTRACT

The invention is directed to a mechanical control unit for a supporting stand for a surgical microscope. The mechanical control unit constrains the surgical microscope to move along the surface of a sphere about the point at which surgery is performed when spatially moving the microscope. In this way, the focusing adjustment of the surgical microscope onto the point of surgery is maintained for each viewing direction. The mechanical control unit is connected via adaptation positions to the supporting stand which is translationally movable in three spatial directions and is rotationally movable about three axes.

6 Claims, 2 Drawing Sheets 5,345,334

MECHANICAL CONTROL UNIT FOR A SURGICAL MICROSCOPE CONNECTED TO A STAND

FIELD OF THE INVENTION

The invention relates to a mechanical control unit for a surgical microscope connected to a stand and spatially movable about a point where surgery is performed.

BACKGROUND OF THE INVENTION

Continuously higher demands on the performance capability of the surgical microscope has accompanied advances in medical and surgical techniques. The surgical microscopes provide a stereomicroscopic view of the operating area. The surgical microscope should be easy to operate and set to the operating area without difficulty so that its use does not demand skill or intellectual concentration by the surgeon thereby allowing the surgeon to devote his undivided attention to the surgery.

For difficult surgical techniques, it is often essential for the success of the surgery that the surgeon can view a limited location in the region of the surgery from all spatial directions. This operating region is referred to as the surgery point in the description which follows.

Swiss Patent 482,439 discloses an adjustable viewing arrangement having an optical viewing device and a headrest for the surgeon. The headrest makes it possible for the surgeon to adjust to various viewing directions with a movement of the head and to maintain the focus adjustment of the surgical microscope. The success of this arrangement in practice is held within limits because the head movement of the surgeon required for adjusting the surgical microscope to another viewing direction detracts the surgeon with respect to concentration on the actual surgery.

U.S. Pat. Nos. 4,339,100 and 4,344,595 describe a stand for a surgical microscope and are incorporated herein by reference. This stand permits the surgeon to spatially guide a surgical microscope about a surgery point utilizing motors or manually and to maintain the focus adjustment. The movement of the surgical microscope about a surgery point with this stand requires skill and experience from the surgeon if the focusing adjustment of the surgical microscope is to be maintained during the movement.

SUMMARY OF THE INVENTION

It is an object of the invention to provide an auxiliary device for the stand referred to above which enables a surgical microscope to be spatially guided about a surgery point while maintaining the focusing adjustment. It is another object of the invention to provide such an auxiliary device which can be manipulated without difficulty and which precludes operating errors.

The mechanical control unit of the invention is for a surgical microscope having a center of gravity (SP). The surgical microscope is operatively connected to a supporting stand and is movable in space about a surgery point (OP) at which surgery is performed. The supporting stand defines horizontal and vertical rotational axes and the mechanical control unit defines a geometric projection point (SP') of the center of gravity (SP) and a geometric projection point (OP') of the surgery point (OP). The mechanical control unit includes: adaptation connecting means provided on the supporting stand for connecting the mechanical control unit thereto; articulated linkage lever means operatively connecting the surgical microscope to the adaptation connecting means for transmitting the movement of the center of gravity (SP) to the geometric projection point (SP'); electrically blockable displacer means for following changes of the spatial coordinates of the surgery point (OP); targeting means for facilitating an adjustment of the mechanical control unit; blocking means for blocking the movement of the surgical microscope; the mechanical control unit being arranged with respect to the supporting stand so as to cause: a first connecting line between the surgery point (OP) and the projection point (OP') to define an intersect point (M) with the vertical and horizontal rotational axes of the supporting stand; a second connecting line between the center of gravity (SP) and the geometric projection point (SP') to pass through the intersect point (M); the surgery point (OP), the intersect point (M) and the center of gravity (SP) conjointly defining a first imaginary triangle; and, the geometric projection point (OP'), the geometric projection point (SP') and the intersect point (M) conjointly defining a second imaginary triangle; and, the first and second triangles to be geometrically similar to each other with each two corresponding sides of the triangles conjointly defining a length ratio determining the transfer of the movement of the center of gravity (SP) to the geometric projection point (SP') thereof.

In an advantageous embodiment of the invention, the mechanical control unit is connected to a supporting stand which comprises a stand base, a vertical supporting column and a horizontal carrier arm configured as an articulated parallelogram and connected to the supporting column. A holder for the operating microscope is provided on the free end of the carrier arm and permits a translatory movement in three spatial directions for the surgical microscope and permits a rotational movement about three rotational axes.

Another advantageous embodiment of the invention is characterized in that the mechanical control unit is connected to a supporting stand which comprises a flange attachable to the ceiling of a room, a vertical supporting column and a horizontal carrier arm configured as an articulated parallelogram and connected to the vertical supporting column. A holder for a surgical microscope is provided at the free end of this carrier arm. The carrier arm permits a translatory movement for the surgical microscope in three spatial directions and a rotational movement about three rotational axes.

In this embodiment of the invention, the geometric imaging of the surgery point and of the gravity center of the surgical microscope through an intersect point M lying on the vertical rotational axis of the stand yields similar triangles lying one inside the other. The one triangle is determined by the gravity center of the surgical microscope, the surgery point and the intersect point lying on the vertical rotational axis; while the other triangle is determined by the geometric projection point of the gravity center and the geometric projection point of the surgery point as well as by the intersect point lying on the vertical axis.

The advantage of the invention is seen in that the surgeon must no longer devote attention to maintaining the focusing adjustment of the surgical microscope when guiding the surgical microscope about a surgery point; rather, the movement of the surgical microscope is guided in a constrained manner by the mechanical control unit and, in this way, the focusing adjustment is maintained for each movement of the surgical microscope about the surgery point.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
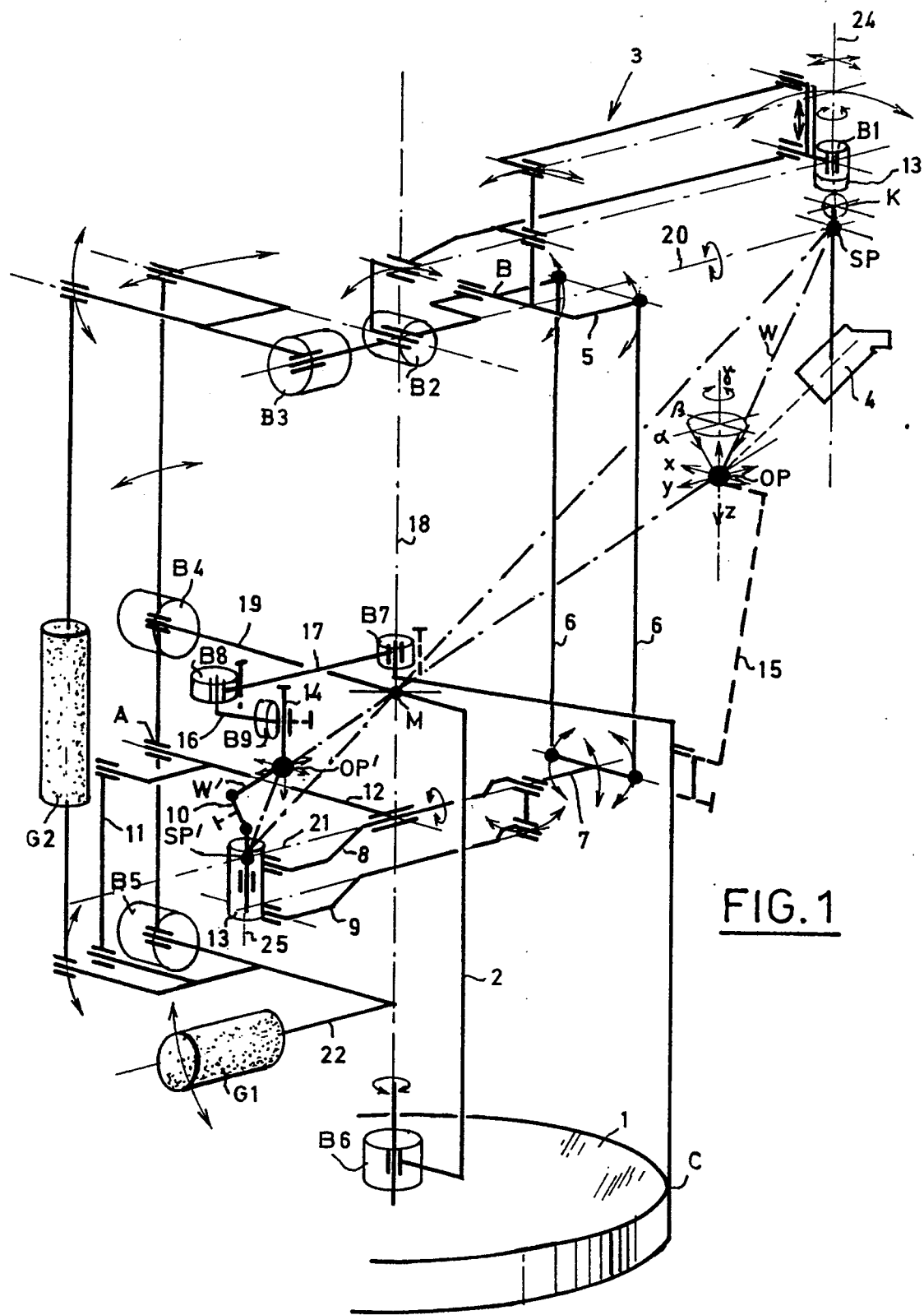
FIG. 1 is a schematic representation of the mechanical control unit connected to a floor stand; and, FIG. 2 is a schematic representation of the mechanical control unit connected to a ceiling stand.

In FIG. 1, a known floor stand is schematically represented which essentially comprises a base 1, a vertical supporting column 2 and a horizontal carrier arm configured as an articulated parallelogram 3 connected to the supporting column 2. A holder for a surgical microscope 4 is provided at the free end of the articulated parallelogram 3. The stand is equipped with rotational bearings, brake bearings and counterweights all described in U.S. Pat. Nos. 4,339,100 and 4,344,595 incorporated herein by reference. Adaptation positions (A, B, C) for the mechanical control unit according to the invention are provided on the stand. The mechanical control unit comprises a lever linkage (5 to 13), an electrically blockable slider unit 14 as well as a targeting device 15 and blocking means (16, 17). Further positioning units such as brakes are identified by reference characters (B1 to B9). The gravity center of the surgical microscope 4 is identified by SP and the point of surgery targeted by the surgical microscope 4 is identified by OP. Reference character K identifies a ball joint which connects the surgical microscope 4 to the articulated parallelogram 3.

All movements of the gravity point SP are transmitted by the mechanical control unit (5 to 13) with a predetermined transmission ratio as a geometric image on the projection point SP'. The projection point SP' moves about the projection point OP' of the point of surgery OP. The vertical axis of the stand is identified by reference numeral 18. The shaft 19 extends perpendicularly to the vertical axis of the stand and intersects the same at point M. The connecting lines from the gravity center SP of the surgical microscope 4 to the projection point SP' as well as from the surgery point OP to the projection point OP' extend likewise through the intersect point M. The triangles defined by the points SP, OP and M on the one hand, and SP', OP' and M on the other hand are geometrically similar triangles and the mutual length ratio of their sides, for example, (OP/SP to OP'/SP' determines the reduction ratio of the motion transmission of the gravity center SP onto its projection point SP'.

The horizontal stand axes 20, 21 and 22 each intersect the vertical axis 18. Counterweights G1 and G2 and brake bearings (B1 to B6) are mounted on the stand. The operating elements (5 to 13) enable the mechanical control unit to function. The lever 5 is mounted at right angles on the parallelogram 3 and enables the transmission of the rolling movements in the direction of angle $\beta$ and of the pivot movements in the direction of angle $\alpha$ of the surgical microscope 4 onto the parallelogram 3. A guide linkage 6 is arranged between the axes 20 and 21 and is fitted at both ends with ball linkages which permit movements in the directions shown by the arrow directions. The right-angled double lever 7 likewise permits transmission of the roll and pivot movements with the roll angle $\beta$ being transmitted via the linkage 8 and the pivot angle $\alpha$ being transmitted via the linkage 9.

Reference numeral 10 identifies a fixable three point linkage for adjusting the viewing direction W and the distance between the points SP' and OP' referred to in the following as the focal length. The linkage 11 provides the parallel guidance of axes 21 and 22. The axis 25 extends parallel to axis 24.

A servo unit 13 provides for an angularly correct imaging of the rotational angle of the optical axis referred to the axis 24. The angle transducer for the servo unit 13 is identified by reference numeral 13'. Positioning the surgery point OP is possible since its geometric projection point OP' is displaced when there are translatory movements and is blocked in location for angular displacements. The displacing unit 14 is arranged perpendicularly and carries the ball joint corresponding to the operating point OP' and is fixable in elevation. For adjustment, the elevation can be blocked by means of a bolt. The scissors (16, 17) makes possible blocking the projection point OP' in the directions of movement (x) and (y) of the surgery point OP. The pivot joints can be blocked with bolts for the adjustment. The targeting device 15 makes possible the adjustment of the apparatus. The scissors (16, 17) are blocked by the fixing bolts and provide a spatially fixed position of the point OP'. For the user of the apparatus, a simple adjusting possibility for the stand which is simple to manipulate takes place with the following work steps:

The surgical microscope 4 is leveled by means of the ball joint (K) on the axis 24.

The gravity point (SP) is brought to axis 20 by adjusting the ball joint K in elevation.

A horizontal balancing is provided by displacing the weight G1.

A deviation to the side is eliminated by displacing the weight G2.

The adjustment of the mechanical control unit takes place with the following steps: blocking the scissors (16, 17) with the fixing bolts provided therefor; releasing the focal length adjustment (SP'-OP'); targeting the targeting device 15; fixing the focal length adjustment (SP'-OP'); and unblocking the scissors (16, 17).

Figure 2:
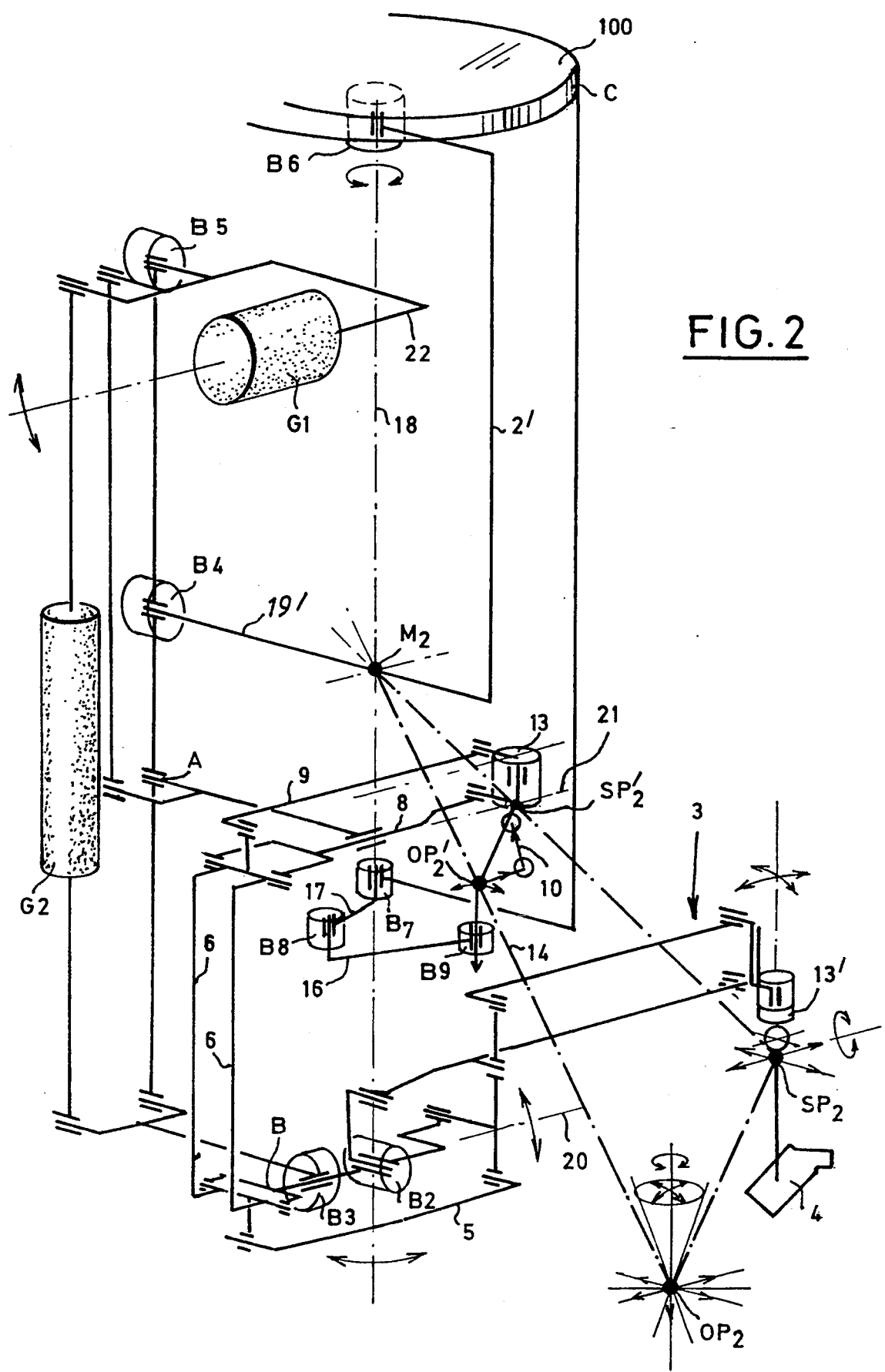

In the illustration of the embodiment of FIG. 2, the same reference numerals are utilized for the same operating elements as in the embodiment of FIG. 1. In lieu of the stand base 1, a flange 100 is provided with which the stand is attached to the ceiling of a room. The vertical supporting column is identified by reference numeral 2' in FIG. 2 and the operating point with $OP_2$, the gravity point of the surgical microscope by $SP_2$ and the corresponding geometric projection points with $OP_2'$ and $SP_2'$. The intersection point of the projection lines with the vertical apparatus axis 18 is identified by $M_2$. The triangles similar to each other, which determine the ratio of the movement transmission, are defined by points $OP_2$, $SP_2$, $M_2$ on the one hand and, $OP_2'$, $SP_2'$ and $M_2$ on the other hand.

The adjustment of the stand and the mechanical unit is carried out pursuant to the guidelines given for the embodiment of FIG. 1.

It is understood that the foregoing description is that of the preferred embodiments of the invention and that various changes and modifications may be made thereto without departing from the spirit and scope of the invention as defined in the appended claims.

What is claimed is:

1. A mechanical control unit for a surgical microscope having a center of gravity (SP), the surgical microscope being connected to a supporting stand mountable on a floor and being movable in space about a surgery point (OP) which is viewed through the surgical microscope in a viewing direction W, the supporting stand defining horizontal and vertical rotational axes, the mechanical control unit defining a geometric projection point (SP') of said center of gravity (SP) and a geometric projection point (OP') of said surgery point (OP), the mechanical control unit comprising:

adaptation connecting means provided on said supporting stand for connecting said mechanical control unit thereto;

articulated linkage lever means for transmitting the movement of said center of gravity (SP) to said geometric projection point (SP') so as to cause the movement of said geometric projection point (SP') to follow said center of gravity (SP);

linkage means for adjusting said viewing direction W and the distance between said points (SP') and OP');

targeting means for facilitating an adjustment of said mechanical control unit;

blocking means for blocking the movement of said surgical microscope;

said mechanical control unit being arranged with respect to said supporting stand so as to cause:

a first connecting line between said surgery point (OP) and said projection point (OP') to define an intersect point (M) with said vertical and horizontal rotational axes of said supporting stand;

a second connecting line between said center of gravity (SP) and said geometric projection point (SP') to pass through said intersect point (M);

said surgery point (OP), said intersect point (M) and said center of gravity (SP) conjointly defining a first imaginary triangle; and, said geometric projection point (OP'), said geometric projection point (SP') and aid intersect point (M) conjointly defining a second imaginary triangle; and, said first and second triangles to be geometrically similar to each other with each two corresponding sides of said triangles conjointly defining a length ratio determining the transfer of movement of said center of gravity (SP) to said geometric projection point (SP') thereof.

2. The mechanical control unit of claim 1, the supporting stand further comprising:

a base mountable on the floor;

a supporting column mounted on said base;

a horizontal carrier arm assembly defining a hinge parallelogram having a free end;

a holding device for said surgical microscope at said free end; and, said supporting stand including means for permitting a translatory movement in three spatial directions and a rotational movement about three axes.

3. The mechanical control unit of claim 1, wherein said center of gravity (SP) of said surgical microscope moves on a spherical surface around said surgery point (OP).

4. A mechanical control unit for a surgical microscope having a center of gravity ($SP_2$), the surgical microscope being operatively connected to a supporting stand mountable on a ceiling and being movable in space about a surgery point ($OP_2$) which is viewed through the surgical microscope in a viewing direction W, the supporting stand defining horizontal and vertical rotational axes, the mechanical control unit defining a geometric projection point ($SP_2'$) of said center of gravity ($SP_2$) and a geometric projection point ($OP_2'$) of said surgery point ($OP_2$), the mechanical control unit comprising:

adaptation connecting means provided on said supporting stand for connecting said mechanical control unit thereto;

articulated linkage lever means for transmitting the movement of said center of gravity ($SP_2$) to said geometric projection point ($SP_2'$) so as to cause the movement of said geometric projection point ($SP_2'$) to follow said center of gravity ($SP_2$);

linkage means for adjusting said viewing direction W and the distance between said points ($SP_2'$) and ($OP_2'$);

targeting means for facilitating an adjustment of said mechanical control unit;

blocking means for blocking the movement of said surgical microscope;

said mechanical control unit being arranged with respect to said supporting stand so as to cause:

a first connecting line to extend from said surgery point ($OP_2$) and pass through an intersect point ($M_2$) lying on said vertical and horizontal rotational axes and to also extend through said projection point ($OP_2'$);

a second connecting line to extend between said center of gravity ($SP_2$) and said intersect point ($M_2$) and to also extend through said projection point ($SP_2'$);

the sides $SP_2/M_2$, $M_2/OP_2$ and $OP_2/SP_2$ defining a first triangle and said sides $SP_2'/M_2$, $M_2/OP_2'$ and $OP_2'/SP_2'$ defining a second triangle;

said first and second triangles to be geometrically similar to each two corresponding sides of said triangles conjointly defining a length ratio determining the ratio of the transfer of movement from said center of gravity $SP_2$ to the projection point $SP_2'$.

5. The mechanical control unit of claim 4, said supporting stand including a flange attachable to the ceiling; a supporting column mounted on said flange;

a horizontal carrier arm assembly defining a hinge parallelogram having a free end;

a holding device for said surgical microscope at said free end; and said supporting stand including means for permitting a translatory movement in three spatial directions and a rotational movement about three axes.

6. The mechanical control unit of claim 4, wherein said center of gravity ($SP_2$) of said surgical microscope moves on a spherical surface around said surgery point.

* * * * *

UNITED STATES PATENT AND TRADEMARK OFFICE
CERTIFICATE OF CORRECTION

PATENT NO. : 5,345,334

DATED : September 6, 1994

INVENTOR(S) : Rudolf Heller

It is certified that error appears in the above-identified patent and that said Letters Patent is hereby corrected as shown below:

Item [56],

On the title page, under "References Cited, U. S. PATENT DOCUMENTS", line 1: delete "4,339,100  2/1982  Heller et al.." and substitute -- 4,339,100  7/1982  Heller et al.. -- therefor.

In column 1, line 13: delete "has" and substitute -- have -- therefor.

In column 3, line 52: delete "(OP/SP to OP'/SP'" and substitute -- ($\overline{OP/SP}$ to $\overline{OP'/SP'}$) -- therefor.

In column 4, line 21: delete "makes" and substitute -- make -- therefor.

In column 5, line 23: delete "OP')" and substitute -- (OP') -- therefor.

In column 5, line 42: delete "aid" and substitute -- said -- therefor.

UNITED STATES PATENT AND TRADEMARK OFFICE
CERTIFICATE OF CORRECTION

PATENT NO. : 5,345,334
DATED : September 6, 1994
INVENTOR(S) : Rudolf Heller

It is certified that error appears in the above-identified patent and that said Letters Patent is hereby corrected as shown below:

In column 6, line 41: delete "$SP_2/M_2$, $M_2/OP_2$ and $OP_2/SP_2$" and substitute -- $\overline{SP_2/M_2}$, $\overline{M_2/OP_2}$ and $\overline{OP_2/SP_2}$ -- therefor.

In column 6, lines 42 and 43: delete "$SP_2'/M_2$, $M_2/OP_2'$ and $OP_2'/SP_2'$" and substitute -- $\overline{SP_2'/M_2}$, $\overline{M_2/OP_2'}$ and $\overline{OP_2'/SP_2'}$ -- therefor.

In column 6, line 43: after "triangle;", insert -- and, --.

In column 6, line 56: after "and", insert -- , --.

Signed and Sealed this

Thirteenth Day of December, 1994

Attest:

BRUCE LEHMAN

*Attesting Officer*    *Commissioner of Patents and Trademarks*